United States Patent [19]

McDonough et al.

[11] Patent Number: 5,991,878
[45] Date of Patent: Nov. 23, 1999

[54] CONTROLLING ACCESS TO INFORMATION

[75] Inventors: John C. McDonough, Braintree; Thiagarajan Saravanan, Westborough; Michael P. Amatucci, Bolton; Louis A. Iannucci, Hudson; David M. Ingham, Newton, all of Mass.

[73] Assignee: FMR Corp., Boston, Mass.

[21] Appl. No.: 08/925,212

[22] Filed: Sep. 8, 1997

[51] Int. Cl.$^6$ ............................... G06F 17/30; H04L 9/00
[52] U.S. Cl. .............................................. 713/200; 707/9
[58] Field of Search ..................................... 713/200, 201, 713/202; 707/9, 10

[56] References Cited

U.S. PATENT DOCUMENTS

| 5,159,685 | 10/1992 | Kung .................................... 395/575 |
| 5,287,505 | 2/1994 | Calvert et al. ......................... 395/600 |
| 5,548,715 | 8/1996 | Maloney et al. ................... 395/183.04 |
| 5,664,106 | 9/1997 | Caccavale ......................... 395/200.54 |
| 5,805,803 | 9/1998 | Birrell et al. ........................... 713/202 |
| 5,875,296 | 2/1999 | Shi et al. ................................ 713/202 |

FOREIGN PATENT DOCUMENTS

| 0 474 058 A2 | 11/1992 | European Pat. Off. ........ G06F 11/00 |
| 0 747 840 A1 | 11/1996 | European Pat. Off. ........ G06F 17/30 |

OTHER PUBLICATIONS

Netscape's DDE Implementation, http://www.netscape.com/newsref/std/ddeapi.html, Mar. 1995, 14 pages.

PCT Search Report dated Sep. 28, 1998.

Rivest, "The MD5 Message–Digest Algorithm", http://andrew2.andrew.cmu.edu/rfc/rfc1321.html, 25 pages, Apr. 1992.

Freier et al., "The SSL Protocol Version 3.0," http://home.netscape.com/eng/ssl3/ss;–toc.html, 3 pages, Mar. 1996.

"Netscape Data Security", http://cgi.netscape.com/newsref/ref/netscape–security.html, 4 pages, 1997.

"Persistent Client State HTTP Cookies", http://cgi.netscape.com/newsref/std/cookie_spec.html, 5 pages, 1997.

"Basic HTTP as defined in 1992", http://www.w3.org/pub/WWW/Protocols/HTTP/HTTP2.html, 31 pages, 1992.

Berners–Lee, "Hypertext Transfer Protocol — HTTP/1.0", http://ds.internic.net/rfc/rfc1945.txt, 53 pages, May 1996.

Fielding, "Hypertext Transfer Protocol — HTTP/1.1", http://www.w3.org/pub/WWW/Protocols/rfc2068/rfc2068, 143 pages, Jan. 1997.

*Primary Examiner*—Thomas M. Heckler
*Attorney, Agent, or Firm*—Fish & Richardson P.C.

[57] ABSTRACT

Methods are provided for controlling access to information in a distributed computing system. A request for the information is received and is accompanied by encrypted session state data. Based on the encrypted session state data, it is determined whether to pass the request on to a source of the information. In a memory buffer, old data is replaced by overwriting with a unique identifier. After the memory buffer has received new data and a procedure has been executed for copying the contents of the memory buffer to a destination, it is determined whether the unique identifier may be found at the destination.

28 Claims, 6 Drawing Sheets

Microfiche Appendix Included
(1 Microfiche, 84 Pages)

| Subcookie Item | Value example |
|---|---|
| LB$T | 000000068$LOG1$AUTH1 |
| LB$R | /ACCOUNTS |
| LB$I | 000-00-0000 |
| LB$A | AB&CD |
| LB$D | AB2 |
| SP$T | 19970601230000 |

102 ⇒ LB$T=000000068$LOG1$AUTH1; LB$R=/ACCOUNTS; LB$I=000-00-0000; LB$A=AB&CD; LB$D=AB2; SP$T=19970601230000

104 ⇒ PRIVATE=0617BE1B02BF1B018BCEF7D9FCB81B0149CD21EB0A8EC38B1E7C07
B44ACD215951A12C003BC17403E89801F606180402 7439B448BB0100CD211EA3
45048EC0488ED833F6C74408434FC7440A4D4DC7440C414EC7440E44008EDEF
CB0EA33FFBEB800FAE88101E8

CONTROLLING ACCESS TO INFORMATION

REFERENCE TO MICROFICHE APPENDIX

An appendix forms part of this application. The appendix, which includes a source code listing relating to an embodiment of the invention, includes 84 frames on 1 page of microfiche.

BACKGROUND OF THE INVENTION

The invention relates to controlling access to information.

Browser software such as Netscape® Navigator™ allows a computer system to request, retrieve, and display pages of information from a World-Wide Web ("Web") server computer across the Internet. In a response to an initial request for one of the pages of information, the Web server computer provides the browser software with a packet (known as a "cookie") of session state data. The browser software then returns a copy of the cookie to the Web server computer together with a subsequent request, allowing the Web server computer to treat the initial and subsequent requests as parts of a unified session.

Often, to respond to such a request, the Web server computer relies on memory buffers in which the requested information is gathered prior to transmission to the browser software. The memory buffers are initially allocated by an operating system procedure. In some operating systems, before allowing use of the buffers, the procedure "cleans" each buffer by filling each buffer with the same standard data string, e.g., "0" or hexadecimal "BA CF ED".

SUMMARY OF THE INVENTION

In general, in one aspect, the invention features a method of controlling access to information in a distributed computing system. The method includes receiving a request (for the information) accompanied by encrypted session state data (e.g., provided as a generic cookie), and, based on the encrypted session state data, determining whether to pass the request to a source (e.g., a server computer) of the information.

Implementations of the invention may include one or more of the following features. The encrypted session state data may define an information-accessing session (e.g., by including a unique identifier for the session), and may be valid for a limited duration (e.g., in accordance with an expiration time indication included in the encrypted session state data). The encrypted session state data may also define information sources (e.g., organized in a hierarchy) for which a user has access authorization (e.g., corresponding to a portion of the hierarchy). If the information is available from multiple sources (e.g., multiple server computers), based on the encrypted session state data, the request may be caused to pass to a one of the sources to which a previous request was passed.

With this method, a computer system (e.g., a networked system of Web servers) is able to keep track of which information (in detail) in the system a user is authorized to retrieve during a single session, without having to maintain state information for the session. For example, if the user is authorized to gain access to information from only particular applications running on only particular Web servers, the encrypted session state data so indicates. In addition, the method allows one of the Web servers to serve as a gatekeeper to the other Web servers, which relieves the other Web servers of the burden of checking for authorization each time a request for information is received.

In general, in another aspect, the invention features a method of controlling access to information. The method includes replacing old data in a memory buffer by overwriting (e.g., by filling the memory buffer) with a unique identifier (e.g., that associates the memory buffer with a request for the information), and, after the memory buffer has received new data and a procedure has been executed for copying the contents of the memory buffer to a destination, determining whether the unique identifier may be found at the destination.

Implementations of the invention may include one or more of the following features. A directive may be received for causing the memory buffer to be allocated with a specified size, and the memory buffer may be allocated with an increased size (e.g., larger than the specified size by at least an amount equal to twice the unique identifier's size).

This method not only helps prevent unintended dissemination of the old data that resided in the memory buffer just after allocation, but also helps prevent the new data in the memory buffer from being provided to a user that lacks authorization for access to the new data.

Other advantages and features will become apparent from the following description and from the claims.

BRIEF DESCRIPTION OF THE DRAWINGS

FIGS. 3, 5 are block diagrams helpful for understanding the procedure of FIGS. 2A–2B.

DESCRIPTION OF THE PREFERRED EMBODIMENTS

Figure 1:
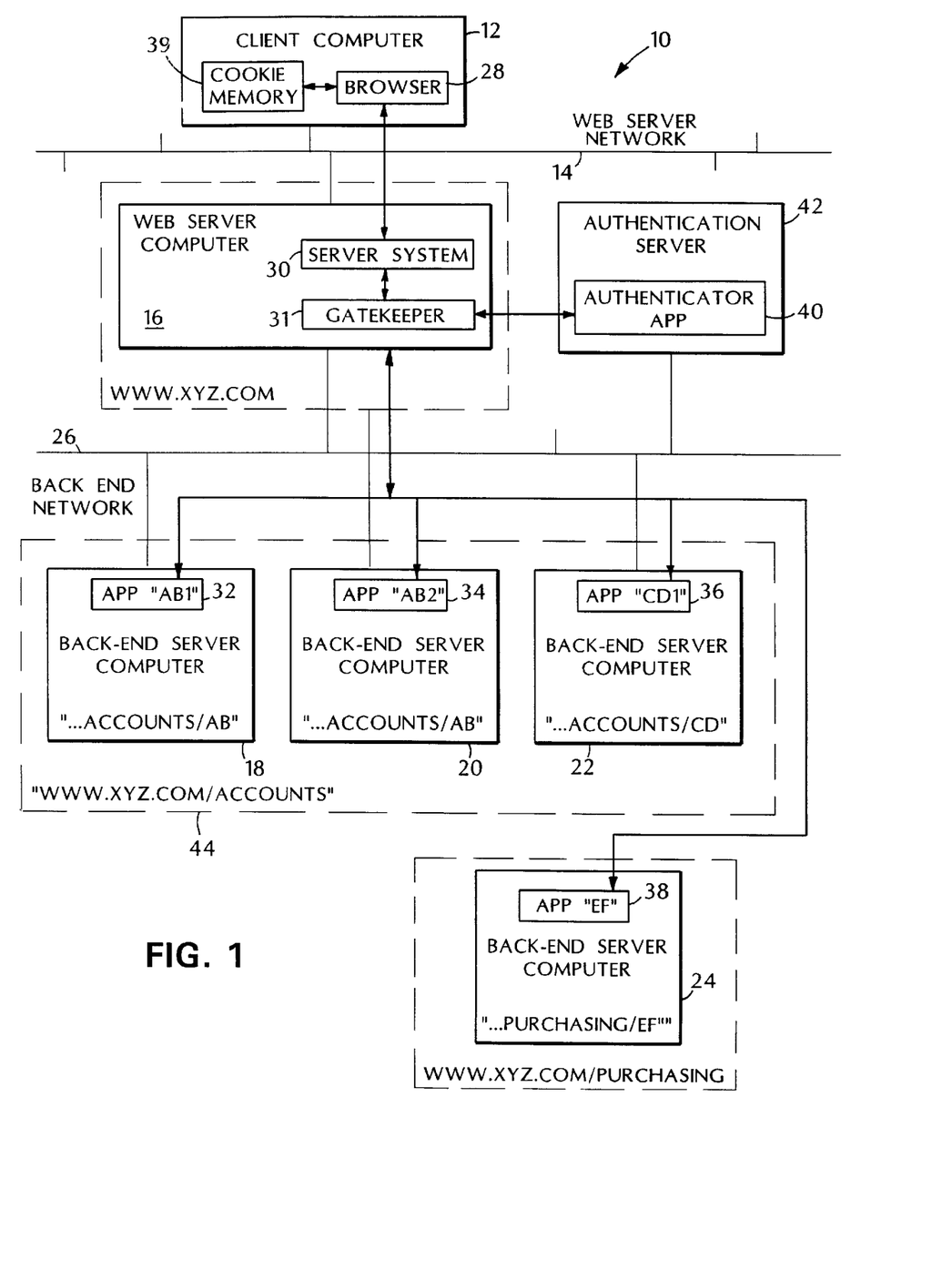
FIGS. 1, 4 are block diagrams of a computer system.

FIG. 1 illustrates a computer system 10 in which a client computer 12 is connected by a Web server network 14 (such as a network based on Internet and World-Wide Web protocols) to a Web server computer 16 that is coupled to multiple back-end server computers 18–24 by a back-end network 26. The client computer runs browser software 28 (such as Netscape® Navigator™ version 2.0 or 3.0 or Microsoft® Internet Explorer version 3.01) to gain access (via server system software 30 and gatekeeper software 31 running on the Web server computer) to information from one or more application software instances 32–38 running on one or more of the back-end server computers.

The information is organized into pages that are logically arranged in accordance with a hierarchical directory structure that allows the browser software to identify each of the pages by a Uniform Resource Locator string ("URL") such as "http://www.xyz.com/accounts/ab/page1.html."

In such a URL, "www.xyz.com" refers to all of the aforementioned application software instances generally, "/accounts" refers to a group (known as a "realm") of these instances, and "/ab" refers to a specific type of the instances in the "/accounts" realm, as described below.

At the client computer, a user specifies the pages of information (e.g., for viewing) by directing the browser software to send URL-based requests to the server system software. The gatekeeper software is provided to prevent the user from gaining access to any of the pages other than those of the pages for which the user has authorization. According to the invention, access is prevented by using a special-purpose information string known as a "smart cookie" that is passed between the browser software and the server system software. (The specification for a generic cookie— session state object—is described in "Persistent Client State HTTP Cookies" and other electronic documents available on the World-Wide Web at <http://cgi.netscape.com/newsref/std/cookie_13 spec.html>, and incorporated by reference.) The smart cookie is created by the gatekeeper software at the beginning of an information-accessing session initiated by the user, and is provided to the browser software for storage in a cookie memory 39 of the client computer. Thereafter during the session, the smart cookie accompanies URL-based requests from the browser software to the server system software, and allows the gatekeeper software to prevent unauthorized access.

Figure 2A:
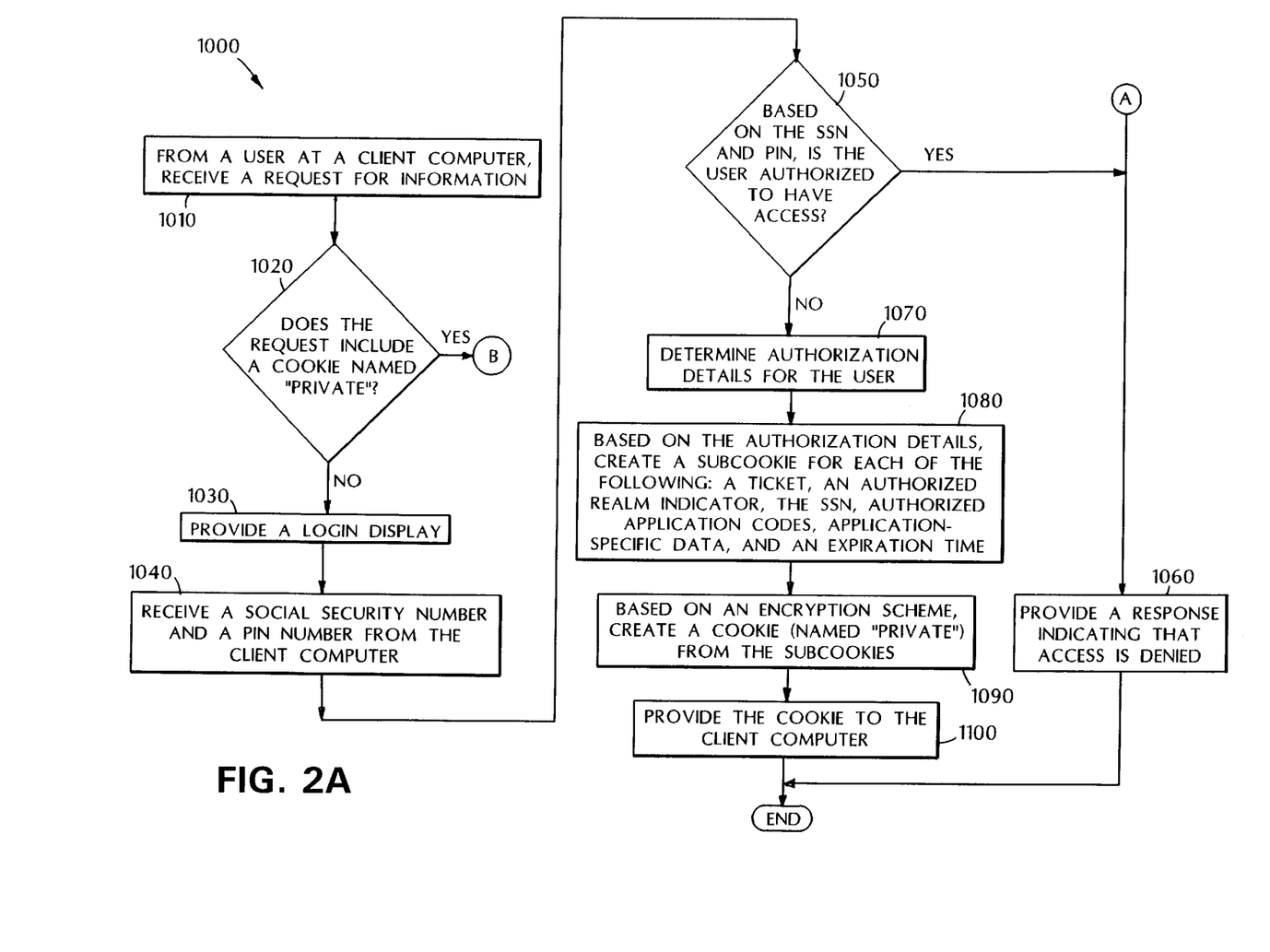
FIGS. 2A–2B are flow diagrams for a procedure executed by the computer system.
Figure 2B:
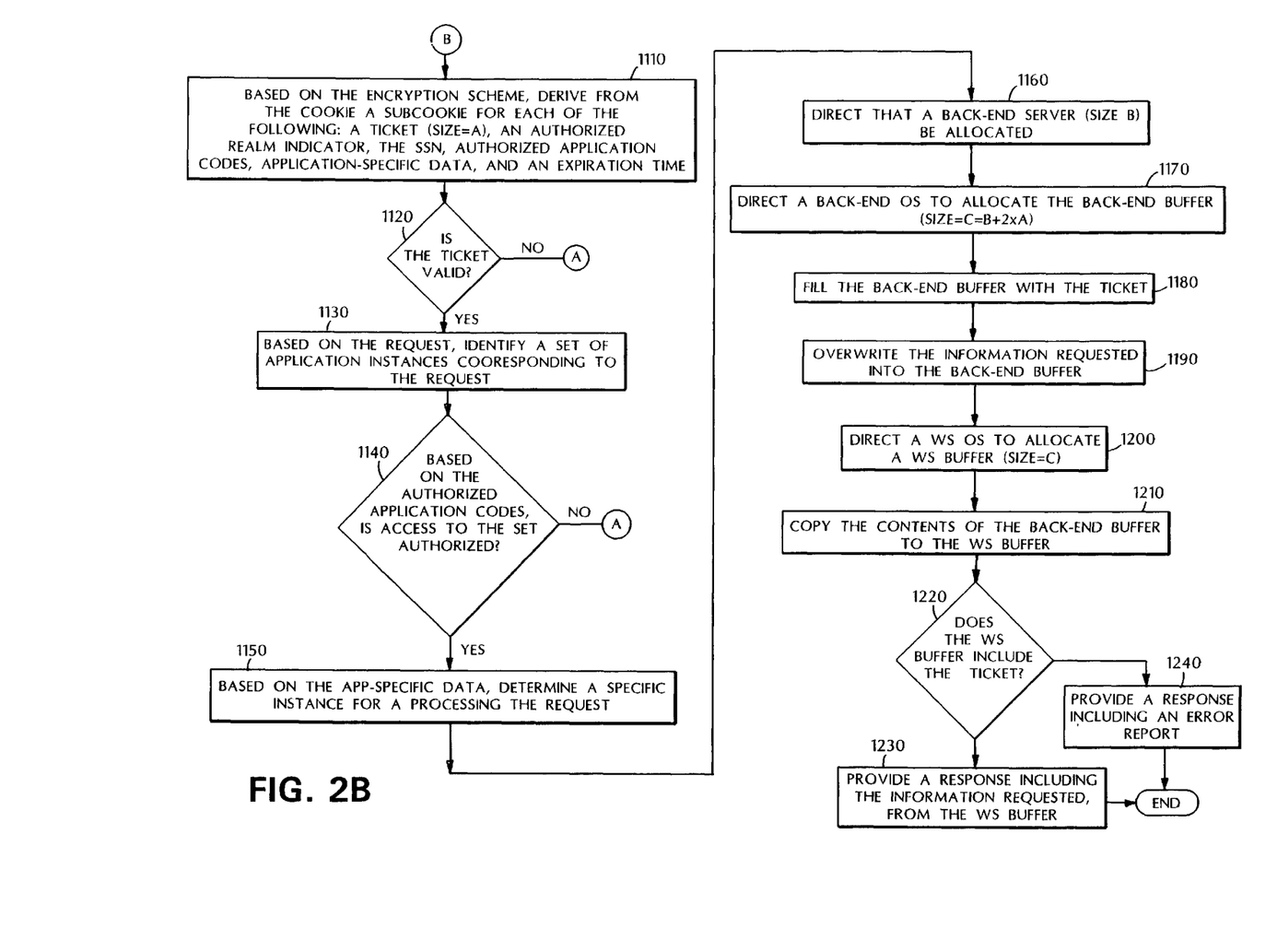

FIGS. 2A–2B illustrate a procedure 1000 executed by the computer system to control access to the pages of information. First, a URL-based request for information is received by the server system software from the browser software (step 1010). The request includes a data packet (made up of the URL and other computer data) that is transferred across the Web server network in accordance with protocols known as HyperText Transport Protocol ("HTTP") (described in Fielding et al, "Hypertext Transfer Protocol —HTTP/1.1" (January 1997), available on the World-Wide Web at <http://www.w3.org/pub/WWW/Protocols/rfc2068/rfc2068>, and incorporated by reference; and Berners-Lee et al, "Hypertext Transfer Protocol—HTTP/1.0" (May 1996), available on the World-Wide Web at <http://ds.internic.net/rfc/rfc1945.txt>, and incorporated by reference) and HyperText Transport Protocol Secure ("HTTPS") (described in "Netscape Data Security" and other electronic documents available on the World-Wide Web at <http://cgi.netscape.com/newsref/ref/netscape-security.html>, and incorporated by reference; and Freier et al, "The SSL Protocol Version 3.0" (March 1996) and other electronic documents available at <http://home.netscape.com/eng/ssl3/ssl-toc.html>, and incorporated by reference). According to the generic cookie specification, HTTP, and HTTPS, the data packet may include (in a "header" section of the packet) at least one generic cookie.

The gatekeeper software determines whether the request includes a generic cookie named "PRIVATE" (step 1020). If not, the browser software is provided with a response that presents the user with a login display having blank fields for a social security number or other user ID ("SSN") and a personal identification number ("PIN") (step 1030). After the user fills in the fields, the gatekeeper software receives the SSN and the PIN (step 1040). Based on the SSN and the PIN, it is determined whether the user is authorized to have access to any of the pages of information (step 1050). The determination is based on a comparison of the PIN to a PIN of record provided for the SSN by authenticator application software 40 (FIG. 1) running on an authentication server computer 42 (which may be linked to another computer, not shown, that stores the PIN of record in a database). If the PIN does not match the PIN of record, it is determined that the user is not authorized to have access, and the browser software is provided with a response indicating that access is denied (step 1060).

However, if the PIN matches the PIN of record, additional authorization details are determined for the user (e.g., from a computer linked to the authentication server computer) (step 1070). These authorization details specify, e.g., the realm and the application software types for which the user has authorization. Based on these details, a subcookie (i.e., a cookie item) is created for each of the following (as exemplified in FIG. 3): a ticket (LB$T) uniquely identifying this session by the user, an authorized realm indicator (LB$R) defining the realm for which the user has authorization, the user's SSN (LB$I) for future reference, authorized application codes (LB$A) specifying the application software types for which the user has authorization, application-specific data (LB$D), and an expiration time indicator (SP$T) for the session (step 1080).

Figure 3:
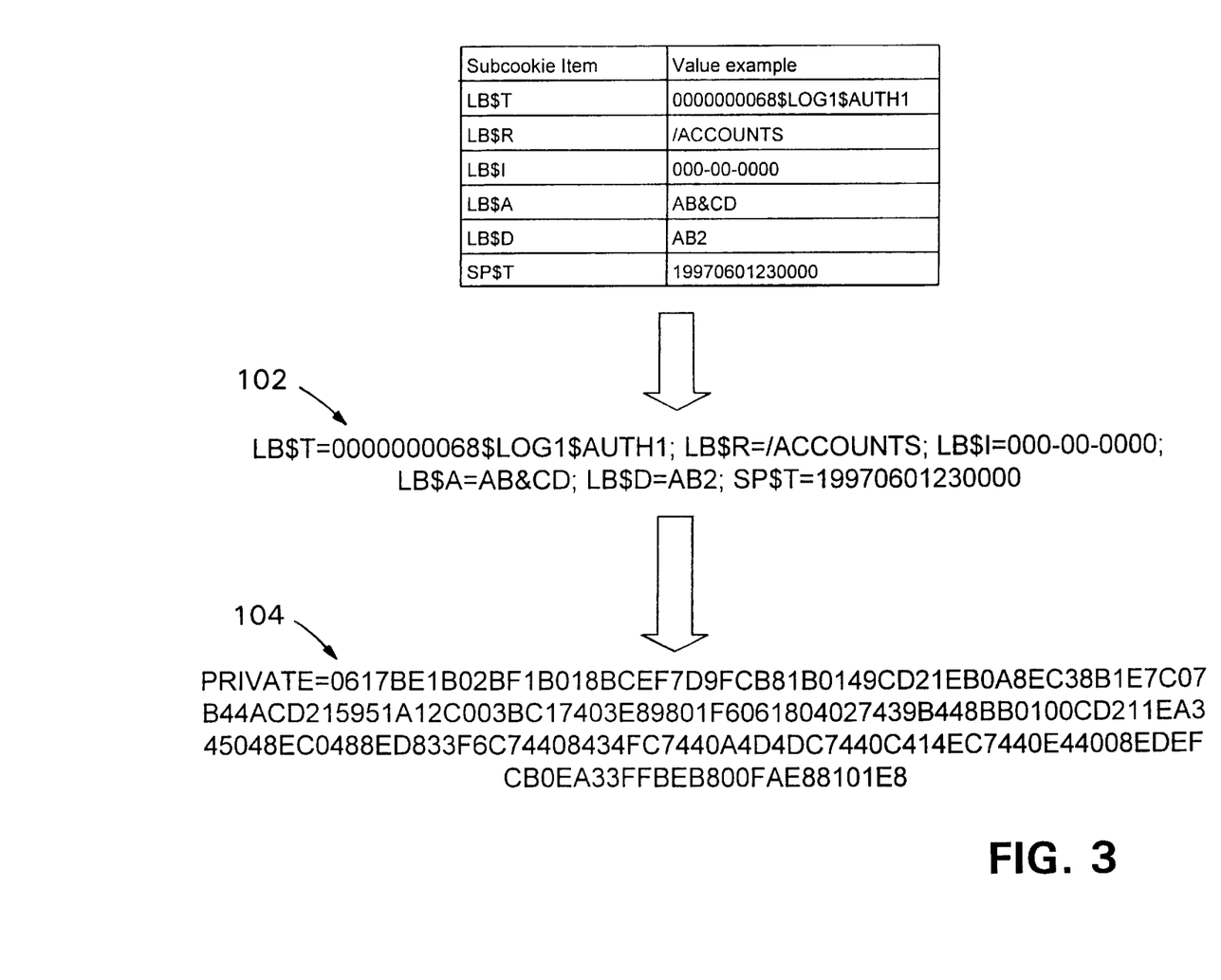

In the example of FIG. 31 the ticket has a predetermined format and includes "0000000068" to indicate that this session by the user is the sixty-eighth session (overall, not merely for the user) to be authenticated. other means of uniquely identifying the session may be used, including choosing a number based on a pseudo-random process. The ticket also includes "LOG1" to indicate that a "LOG1" instance of logging application software is to be used to record information about the user's activity during this session. Lastly, the ticket includes "AUTH1" to indicate that an "AUTH11" instance of the authenticator application software was responsible for authentication in this session.

The authorized realm indicator in FIG. 3 indicates that the user's access to the pages of information is limited at least to an "/accounts" realm that consists of pages of information from application software instances 32, 34, 36. The authorized application codes "AB" and "CD" indicate that the user's access is further limited to pages of information from application software types "AB" and "CD" (or application types with names associated with codes "AB" and "CD").

In the application-specific data of FIG. 3, "AB2" indicates that the gatekeeper should direct requests for "AB"-type pages of information to application software instance 34. For example, for the purpose of load-balancing, scaling, or fault-tolerance, application software instance 34 may provide the same pages of information as application software instance 32. In such a case, if application software instance 34 has already been used for processing an "AB"-type request in a session, application software instance 34 is re-used for each subsequent "AB"-type request in the session. Such re-use not only facilitates management of load-balancing, but also takes advantage of caching and similar performance-enhancement features provided by the back-end server computer.

Finally according to the expiration time indicator of FIG. 3 ("19970601230000"), the smart cookie is not valid after 11:00 PM on Jun. 1, 1997.

After the subcookies are created, the smart cookie 102 (FIG. 3) is created (step 1090) as shown in FIG. 3, by concatenating the subcookies (delimited by semicolons and spaces) and then encrypting and converting to a text representation 104 of hexadecimal notation, to produce an encrypted text string. Preferably, the encryption is based on a 128-bit private key used in accordance with a message digest construct standard such as MD5 (described in R. Rivest, "The MD5 Message-Digest Algorithm" (April 1992), which is available on the World-Wide Web at <http://andrew2.andrew.cmu.edu/rfc/rfc1321.html>, and incorporated by reference). However, any type of encryption may be used, depending on the level of access security required.

Finally, the smart cookie is provided as a generic cookie named "PRIVATE" to the client computer for storage in the cookie memory (step 1100). At this point, after having sent the request that lacked the generic cookie named "PRIVATE" (step 1020), the user is now equipped to gain access to the pages of information for which the user has authorization.

On the other hand, if it is determined that the request already includes a generic cookie named "PRIVATE" (i.e., the smart cookie described above) (step 1020), the computer system executes as follows. The subcookies described above are derived from the smart cookie (step 1110). It is determined whether the ticket is valid (step 1120). The ticket is invalid if the ticket lacks the predetermined format described above or has expired according to the expiration time indicator, in which case the browser software is provided with a response indicating that access is denied (step 1060).

Otherwise, based on the request, a set of application software instances is identified (step 1130). This identified set is determined by the URL included in the request. For example, with respect to FIG. 1, if the URL includes "http://www.xyz.com/accounts/AB", "http://www.xyz.com/accounts/CD", or "http://www.xyz.com/purchasing/EF", the identified set includes instances 32 and 34, instance 36, or instance 38, respectively.

Based on the authorized application codes (and the authorized realm indicator) derived from the smart cookie, it is then determined whether the user is authorized to have access to the identified set (step 1140). For example, the authorized realm indicator may include "/test" and the authorized applications codes may include "GH" and "IJ". In such a case, if the URL includes "/working/GH", the authorized realm indicator blocks access to a corresponding "GH" application software instance even though the authorized applications codes include "GH". If the user is not authorized to have access, the browser software is provided with a response indicating that access is denied (step 1060).

Otherwise, based on the application-specific data (e.g., indicating "AB2" in FIG. 3) derived from the smart cookie, the gatekeeper determines a specific application software instance (e.g., instance 34) for processing the request (step 1150). The application-specific data may lack an indication of a specific instance (e.g., because the request is the session's first involving a particular type of application software instance). If so, the instance is selected according to a load-balancing strategy and is noted for future reference in application-specific data provided in an updated smart cookie that accompanies a substantive response to the request, as described below.

The request then causes interaction between the Web server computer and one of the back-end server computers (e.g., computer 20) as described below to produce the information requested for inclusion in the substantive response. In the interaction, the ticket is used for helping to prevent the substantive response from including any information to which the user lacks authorized access.

Figure 4:
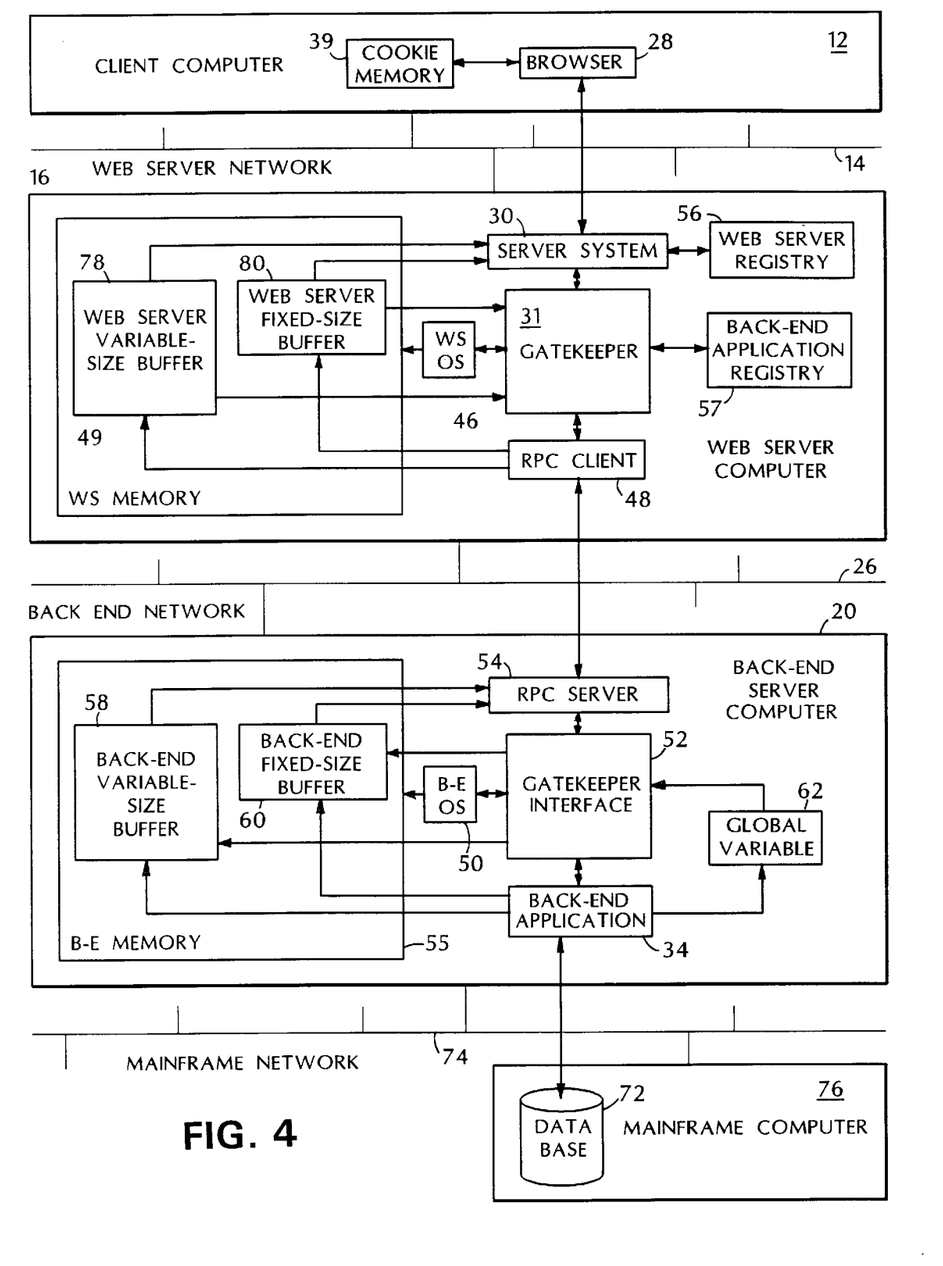

In particular, with reference now also to FIG. 4, the Web server computer also runs Web server operating system software ("WS OS") 46 and Remote Procedure Call ("RPC") client software 48 and has a Web server memory 49. The back-end server computer also runs back-end server operating system software ("B-E OS") 50, gatekeeper interface software 52, and RPC server software 54, and has a back-end memory 55. By converting between local function calls and network requests (as described in "RPC: Remote Procedure Call Protocol Specification Version 2" (June 1988), available on the World-Wide Web at ftp://ds.internic.net/rfc/rfc1057.txt, and incorporated by reference), the RPC client and server software pair provide a function-call bridge 48–54 that allows the gatekeeper software to invoke directly functions provided by the gatekeeper interface software.

The Web server computer also has a Web server registry 56 that associates types of URLs with software functions. In particular, if the request's URL includes "0.401", the server system software determines from the Web server registry that a Connect( ) function of the gatekeeper software should be invoked. (The association of "0.401" with the Connect( ) function is made when the gatekeeper software —implemented as one or more Dynamic Link Library ("DLL") files—is started and registers at that time with the server system software.)

Similarly, the Web server computer also has a back-end application registry 57 that associates application software instances with respective UserConnect ( ) functions (described below). Each of these associations is provided when the respective application software instance is started.

After the Connect ( ) function is invoked, the gatekeeper software causes the application software instance 34 (hereafter referred to as the back-end application software 34) to direct that a back-end server buffer (variable-sized 58 or fixed-size 60 as described below) of a specified size be allocated in the back-end memory (step 1160). Such a direction is accomplished in the following way. By parsing the URL in accordance with the smart-cookie-based access authorization described above, the gatekeeper software determines that the back-end application software should process the request. Across the RPC function-call bridge 48–54 and based on the appropriate association in the back-end application registry, the gatekeeper software then invokes the "UserConnect(URL,ticket)" function of the gatekeeper interface software. The back-end server computer has a global variable 62 (known as "g_pTheApp") that is set when the back-end application software is started and that points to a different "UserConnect(URL,ticket)" function (that is provided by the back-end application software). Using g_pTheApp, the gatekeeper interface software invokes the back-end application software's "UserConnect(URL,ticket)" function, which is provided with the URL from the request and the ticket from the smart cookie accompanying the request. As a result, the back-end application directs that the back-end buffer be allocated, with a specified size. (Preferably the back-end variable-size buffer is used only if the back-end fixed-size (e.g., 64 kilobyte) buffer is too small for the information to be included in the substantive response.)

The gatekeeper interface software then causes the B-E OS to allocate as described above, except with an increased size equal to the specified size plus twice the size of the ticket (step 1170). The increased size is used instead of the specified size to help ensure that the back-end buffer has sufficient space for both the ticket and the information to be included in the substantive response, as described below.

FIG. 5 shows an example of the buffer as allocated initially, including a ticket area 70 that is provided as a result of the use of the increased size instead of the specified size. Initially, the buffer (including the ticket area) includes old data (i.e., the data held in the buffer's locations before allocation) such as the contents of one or more previous back-end buffers. (As such back-end buffers are allocated, used, and de-allocated in the back-end memory, portions of the back-end memory are re-used each time.)

After the B-E OS allocates the back-end buffer, the gatekeeper interface software fills the back-end buffer with the ticket (step 1180) as exemplified in FIG. 5, where the ticket is "TICKET" represented in American Standard Code for Information Interchange ("ASCII") hexadecimal notation as "54 49 43 4B 45 54". Note that the ticket fills the ticket area as well as the rest of the buffer. Because the ticket area is twice the size of the ticket, the ticket appears in full in the ticket area at least once.

Next, the back-end application overwrites the information requested into the back-end buffer (step 1190), as exemplified in FIG. 5. For example, the information requested may include text data derived from a database 72 stored across a mainframe network 74 (FIG. 4) on a mainframe computer 76, and provided for display at the client computer. Note that because the back-end buffer has the increased size (instead of the specified size that was designated and is expected by the back-end application), the information requested does not overwrite the ticket area, in which the ticket still appears (absent an error).

The "UserConnect(URL,ticket)" function (that is provided by the back-end application software) then terminates, which leads to the allocation of a corresponding Web server buffer (Web server variable-size buffer 78 or Web server fixed-size buffer 80) that has the same size as the back-end buffer (step 1200). The Web server buffer is so allocated by the WS OS. Across the function-call bridge, the contents of the back-end buffer are copied to the Web server buffer (step 1210). (Subsequently, the back-end buffer is de-allocated to allow re-use of the back-end buffer's share of the back-end memory.)

At this point, the gatekeeper software determines whether the Web server buffer includes the ticket (step 1220). If the ticket is so included, the information requested is provided (from the Web server buffer) in the substantive response (step 1230), and the procedure terminates. As noted above, if an updated smart cookie has been produced, the updated smart cookie accompanies the substantive response and replaces the existing smart cookie in accordance with the generic cookie specification also noted above.

However, if the ticket is not so included (indicating a problem such as the copying of the wrong information from the back-end memory), information is not provided from the Web server buffer. Instead, a response including an error report is provided (step 1240), and the procedure terminates.

One or more of the pages of information may include text formatted in accordance with, e.g., a specification known as Hypertext Markup Language ("HTML"). The browser software may be, e.g., Netscape® Navigator™ version 2.0 or 3.0 (as mentioned above) or Microsoft® Internet Explorer version 3.0, or any other software allowing use of a generic cookie. One or more of the server computers may include, e.g., a Sun™ UltraSPARC™ or a Compaq® ProLiant™ running an operating system such as Solaris™ or Microsoft® Windows® NT, or an IBM® RS6000 running an operating system such as IBM® OS/2 or AIX. One or more of the networks may be based on a protocol such as Transmission Control Protocol and Internet Protocol ("TCP/IP"). The client computer may include a personal computer having a processor such as an Intel® Pentium®. One or more of the operating systems may be, e.g., Microsoft® Windows® NT, Microsoft® Windows® 95, UNIX®, OS/2®, or Java™. The mainframe computer may include, e.g., an IBM® 3090 running an operating system such as IBM® MVS 5.2, or a Pyramid® NILE™ computer.

The technique (i.e., the procedure described above) may be implemented in hardware or software, or a combination of both. Preferably, the technique is implemented in computer programs (such as the gatekeeper software and gatekeeper interface software described above) executing on programmable computers that each include a processor, a storage medium readable by the processor (including volatile and non-volatile memory and/or storage elements), at least one input device such as a keyboard, and at least one output device. Program code is applied to data entered using the input device to perform the method described above and to generate output information. The output information is applied to one or more output devices such as a display screen of the client computer.

Each program is preferably implemented in a high level procedural or object-oriented programming language (such as Microsoft Visual C++ version 4.0) to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, if the back-end fixed-size buffer serves as the back-end buffer, the back-end buffer may be filled with the ticket before the "UserConnect(URL,ticket)" function (that is provided by the back-end application software) is invoked.

The application-specific data may include details (such as limited authorization details, or selections for time zone, language, or currency) that are useful to the application software itself, which may retrieve such details by invoking functions of the gatekeeper software.

To reduce the opportunities for the smart cookie to be replaced by a garbled updated smart cookie, the updated smart cookie may accompany substantive responses to requests for text data only. Or, for similar reasons, the updated smart cookie may accompany substantive responses to all requests except for requests relating to retrieval of supporting data such as image data.

This patent document (including the microfiche appendix) contains material that is subject to copyright protection. The copyright owner has no objection to the facsimile reproduction by anyone of the patent document as it appears in the Patent and Trademark Office file or records, but otherwise reserves all copyright rights whatsoever.

What is claimed is:

1. A method of controlling access to information in a distributed computing system, the method comprising:

receiving a request for the information, the request accompanied by encrypted session state data, the encrypted session state data being valid for a limited duration; and based on the encrypted session state data, determining whether to pass the request to a source of the information.

2. The method of claim 1, further comprising:

providing the encrypted session state data as a generic cookie.

3. The method of claim 1, wherein the encrypted session state data defines an information-accessing session.

4. The method of claim 1, wherein the encrypted session state data includes a unique identifier for an information-accessing session.

5. The method of claim 1, wherein the encrypted session state data comprises an indication of an expiration time.

6. The method of claim 1, further comprising:

if the in formation is available from multiple sources, based on the encrypted session state data, causing the request to be passed to a one of the sources to which a previous request was passed.

7. The method of claim 1, wherein the encrypted session state data defines information sources for which a user has access authorization.

8. The method of claim 7, wherein
the information sources are organized in a hierarchy; and
the encrypted session state data defines a portion of the hierarchy, the user having access authorization corresponding to the portion.

9. A method of controlling access to information, the method comprising:
in a memory buffer, replacing old data by overwriting with a unique identifier; and
after the memory buffer has received new data and a procedure has been executed for copying at least some of the contents of the memory buffer to a destination, determining whether the unique identifier may be found at the destination.

10. The method of claim 9, further comprising
receiving a request for the new data, wherein the unique identifier associates the memory buffer with the request.

11. The method of claim 9, further comprising:
filling the memory buffer with the unique identifier.

12. The method of claim 9, further comprising
receiving a directive to cause the memory buffer to be allocated with a specified size; and
causing the memory buffer to be allocated with an increased size.

13. The method of claim 12, wherein
the unique identifier has an identifier size; and
the increased size is larger than the specified size by at least an amount equal to twice the identifier size.

14. A method of controlling access to information, the method comprising:
providing encrypted session state data to browser software running on a client computer, the encrypted session state data including a unique identifier for an information-accessing session;
at a gatekeeper computer, receiving a request for the information, the encrypted session state data accompanying the request;
based on the encrypted session state data, determining whether to pass the request to a server computer serving as a source for the information;
at the server computer, directing that a memory buffer be allocated with a specified size;
causing the memory buffer to be allocated with an increased size being larger than the specified size by amount equal to twice the unique identifier's size;
filling the memory buffer with the unique identifier;
providing the information in the memory buffer;
at the gatekeeper computer, causing a gatekeeper memory buffer to be allocated with the increased size;
copying the contents of the memory buffer to the gatekeeper memory buffer;
determining whether the unique identifier may be found in the gatekeeper memory buffer; and
if the unique identifier is found in the gatekeeper memory buffer, providing the information in a substantive response to the browser software.

15. Computer software, residing on a computer-readable storage medium, comprising instructions for use in a computer system to controlling access to information in a distributed computing system, the instructions causing the computer system to:
receive a request for the information, the request accompanied by encrypted session state data, the encrypted session state data being valid for a limited duration; and
based on the encrypted session state data, determine whether to pass the request to a source of the information.

16. The computer software of claim 15, wherein the computer software further comprises instructions for causing the computer system to:
provide the encrypted session state data as a generic cookie.

17. The computer software of claim 15, wherein the encrypted session state data defines an information-accessing session.

18. The computer software of claim 15, wherein the encrypted session state data includes a unique identifier for an information-accessing session.

19. The computer software of claim 15, wherein the encrypted session state data comprises an indication of an expiration time.

20. The computer software of claim 15, wherein the computer software further comprises instructions for causing the computer system to:
if the information is available from multiple sources, based on the encrypted session state data, cause the request to be passed to a one of the sources to which a previous request was passed.

21. The computer software of claim 15, wherein the encrypted session state data defines information sources for which a user has access authorization.

22. The computer software of claim 21, wherein
the information sources are organized in a hierarchy; and
the encrypted session state data defines a portion of the hierarchy, the user having access authorization corresponding to the portion.

23. Computer software, residing on a computer-readable storage medium, comprising instructions for use in a computer system to control access to information, the instructions causing the computer system to:
in a memory buffer, replace old data by overwriting with a unique identifier; and
after the memory buffer has received new data and a procedure has been executed for copying at least some of the contents of the memory buffer to a destination, determine whether the unique identifier may be found at the destination.

24. The computer software of claim 23, wherein the computer software further comprises instructions for causing the computer system to:
receive a request for the new data, wherein the unique identifier associates the memory buffer with the request.

25. The computer software of claim 23, wherein the computer software further comprises instructions for causing the computer system to:
fill the memory buffer with the unique identifier.

26. The computer software of claim 23, wherein the computer software further comprises instructions for causing the computer system to:
receive a directive to cause the memory buffer to be allocated with a specified size; and
cause the memory buffer to be allocated with an increased size.

27. The computer software of claim 26, wherein the unique identifier has an identifier size; and the increased size is larger than the specified size by at least an amount equal to twice the identifier size.

28. Computer software, residing on a computer-readable storage medium, comprising instructions for use in a computer system to control access to information, the instructions causing the computer system to:

provide encrypted session state data to browser software running on a client computer, the encrypted session state data including a unique identifier for an information-accessing session;

at a gatekeeper computer, receive a request for the information, the encrypted session state data accompanying the request;

based on the encrypted session state data, determine whether to pass the request to a server computer serving as a source for the information;

at the server computer, direct that a memory buffer be allocated with a specified size;

cause the memory buffer to be allocated with an increased size being larger than the specified size by amount equal to twice the unique identifier's size;

fill the memory buffer with the unique identifier;

provide the information in the memory buffer;

at the gatekeeper computer, cause a gatekeeper memory buffer to be allocated with the increased size;

copy the contents of the memory buffer to the gatekeeper memory buffer;

determine whether the unique identifier may be found in the gatekeeper memory buffer; and if the unique identifier is found in the gatekeeper memory buffer, provide the information in a substantive response to the browser software.

* * * * *